(12) United States Patent
Fukumura

(10) Patent No.: US 6,455,829 B1
(45) Date of Patent: Sep. 24, 2002

(54) HEAD UNIT OF PHOTO DETECTOR

(75) Inventor: Koji Fukumura, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 09/351,139

(22) Filed: Jul. 12, 1999

(30) Foreign Application Priority Data

Feb. 3, 1999 (JP) .......................................... 11-025818
Mar. 2, 1999 (JP) .......................................... 11-053790

(51) Int. Cl.$^7$ ............................................ G02B 27/40
(52) U.S. Cl. .................. 250/201.5; 250/216; 369/44.17
(58) Field of Search ................................. 250/201, 216, 250/201.5, 201.1; 235/42; 369/112, 44.17, 44.23, 44.11, 44.14

(56) References Cited

U.S. PATENT DOCUMENTS

| | | | |
|---|---|---|---|
| 3,345,835 A | | 10/1967 | Nickell et al. ................ 66/166 |
| 4,510,383 A | | 4/1985 | Ruppender .................. 235/462 |
| 5,023,439 A | * | 6/1991 | Noda et al. .............. 250/201.5 |
| 5,532,999 A | * | 7/1996 | Aikoh et al. ................ 369/120 |
| 5,838,652 A | * | 11/1998 | Kishita ........................ 369/112 |
| 6,164,544 A | * | 12/2000 | Schwartz et al. ...... 235/462.13 |

FOREIGN PATENT DOCUMENTS

EP 0 550 271 A1 7/1993

OTHER PUBLICATIONS

European Search Report.

* cited by examiner

*Primary Examiner*—Frank G. Font
*Assistant Examiner*—Layla Lauchman
(74) *Attorney, Agent, or Firm*—Morgan, Lewis & Bockius LLP

(57) ABSTRACT

A head unit of a photo detector for irradiating a target area with detection light having a pencil of rays substantially shaped like a belt in transverse section and receiving light reflected in the target area. The head unit includes a belt-like-light generation lens having different light gathering functions relative to two directions orthogonal to each other in the transverse section of the pencil of rays for generating detection light substantially shaped like a belt, a light emission section for emitting the detection light from a first interface of the belt-like-light generation lens through a second interface of the belt-like-light generation lens to the target area, and a light reception section for receiving reflected light incident on the light reception section through the first interface of the belt-like-light generation lens from the second interface.

14 Claims, 10 Drawing Sheets

HEAD UNIT OF PHOTO DETECTOR

BACKGROUND OF THE INVENTION

1. Field of the Invention

This invention relates to a head unit of a photo detector.

2. Description of the Related Art

Figure 10A:
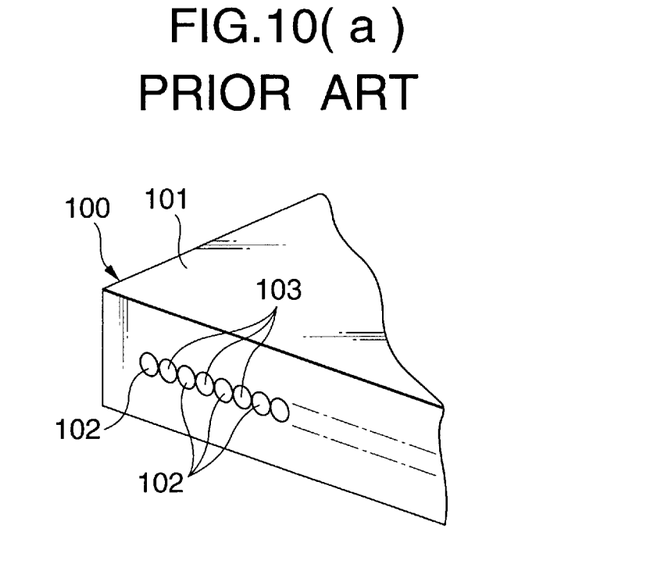
FIG. 10(a) is a perspective view to show a conventional head unit.

Hitherto, a photo detector for irradiating a target area with detection light substantially shaped like a belt and receiving reflected light therefrom to detect a workpiece or the like has been known. FIG. 10(a) shows an example of the structure of a head unit of the photo detector.

In FIG. 10(a), a head unit 100 comprises an alternating pattern of light emission optical fibers 102 and light reception optical fibers 103 arranged in and fixed to a case 101 with an end face exposed.

However, in the related art, a large number of optical fibers 102 and 103 are arranged in the case 101, thus the head unit 100 is upsized.

Since a large number of optical fibers are arranged in a row and fixed to the case 101, the manufacturability of the head unit 100 is poor.

SUMMARY OF THE INVENTION

It is therefore an object of the invention to miniaturize a head unit of a photo detector for irradiating a target area with detection light substantially shaped like a belt and receiving reflected light therefrom.

Further, it is another object of the invention to improve the manufacturability of the head unit of the photo detector.

To accomplish the above object, according to a first aspect of the invention, there is provided a head unit of a photo detector for irradiating a target area with detection light having a pencil of rays substantially shaped like a belt in transverse section and receiving light reflected in the target area, the head unit comprising: a light emission section for emitting light to the target area; an optical system for shaping the transverse section form of the pencil of rays from the light emission section into a form substantially shaped like a belt and gathering the light in a direction orthogonal to a length direction in the transverse section of the pencil of rays substantially shaped like a belt for generating detection light substantially shaped like a belt; and a light reception section for receiving the light reflected in the target area and incident on the light reception section through the optical system.

The spot-like light emitted from the light emission section is formed into detection light substantially shaped like a belt by the function of the optical system and the detection light is applied to the target area. The detection light is reflected by an object to be detected or the background in the target area and the reflected light is received at the light reception section through the optical system.

According to a second aspect of the invention, there is provided a head unit of a photo detector for irradiating a target area with detection light having a pencil of rays substantially shaped like a belt in transverse section and receiving light reflected in the target area, the head unit comprising: a belt-like-light generation lens having different light gathering functions relative to two directions orthogonal to each other in the transverse section of the pencil of rays for generating detection light substantially shaped like a belt; a light emission section for emitting the detection light from a first interface of the belt-like-light generation lens through a second interface of the belt-like-light generation lens to the target area; and a light reception section for receiving reflected light incident on the light reception section through the first interface of the belt-like-light generation lens from the second interface.

The spot-like light emitted from the light emission section passes through the belt-like-light generation lens and is formed into detection light substantially shaped like a belt and the detection light is applied to the target area. The detection light is reflected by an object to be detected or the background in the target area and the reflected light passes through the belt-like-light generation lens and is received at the light reception section.

In the invention, a mirror as well as a lens can be used as the "optical element for gathering light". In the first and second aspects of the invention, more than one lens may be used.

The "optical system" may be made up of two or more optical elements such as a combination of a slit and a lens in addition to a combination of lenses.

The "substantially shaped like a belt" contains not only a shape like a belt or a line, but also an extremely elongated ellipse and the like.

Generally, a bar-like lens such as a cylindrical lens or an elongated plate-like lens can be used as the "belt-like-light generation lens".

The "light gathering" or "gathering light" refers to making light attempted to spread at a predetermined divergence angle parallel light or making a divergence angle small in addition to converging light. Therefore, the light emitted from a point light source passes through the belt-like-light generation lens and becomes a pencil of rays substantially shaped like an elongated belt.

In addition to the end faces of optical fibers, such elements as LED, LD, and PD can also be used as the "light emission section" and the "light reception section".

DETAILED DESCRIPTION OF THE PREFERRED EMBODIMENTS

Referring now to the accompanying drawings, there are shown preferred embodiments of the invention.

Figure 1:
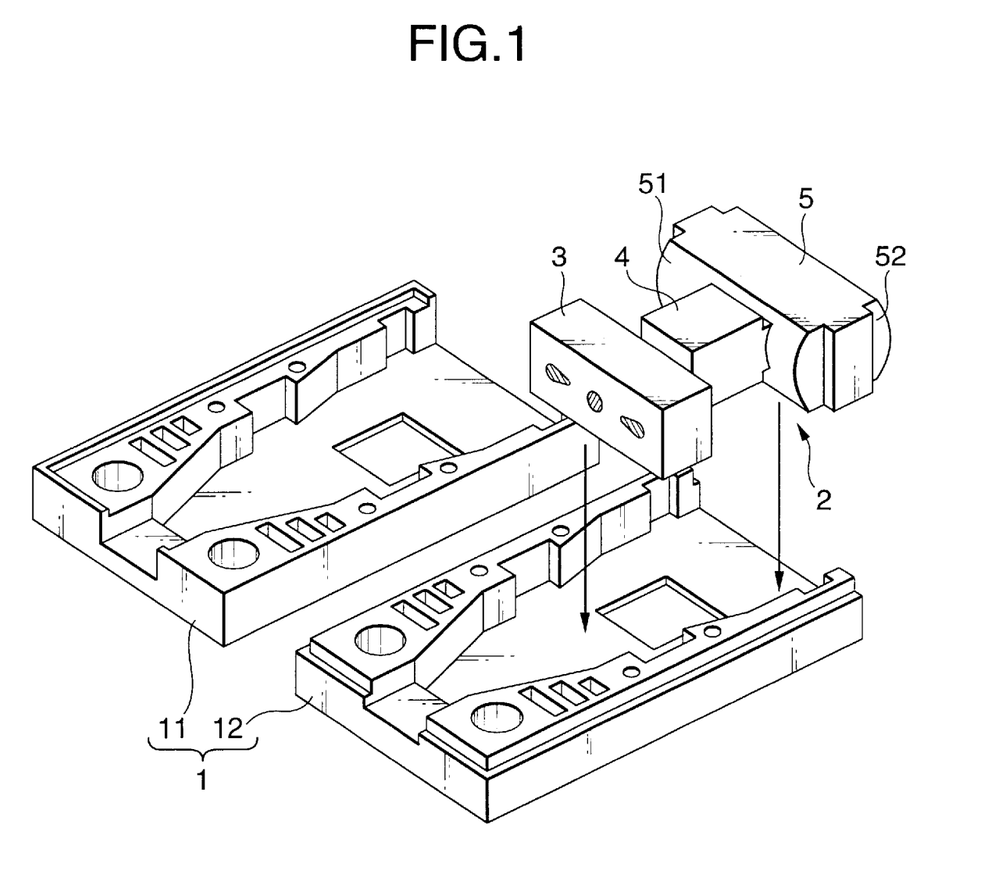
FIG. 1 is an exploded perspective view to show an embodiment of a head unit of the invention.
Figure 2:
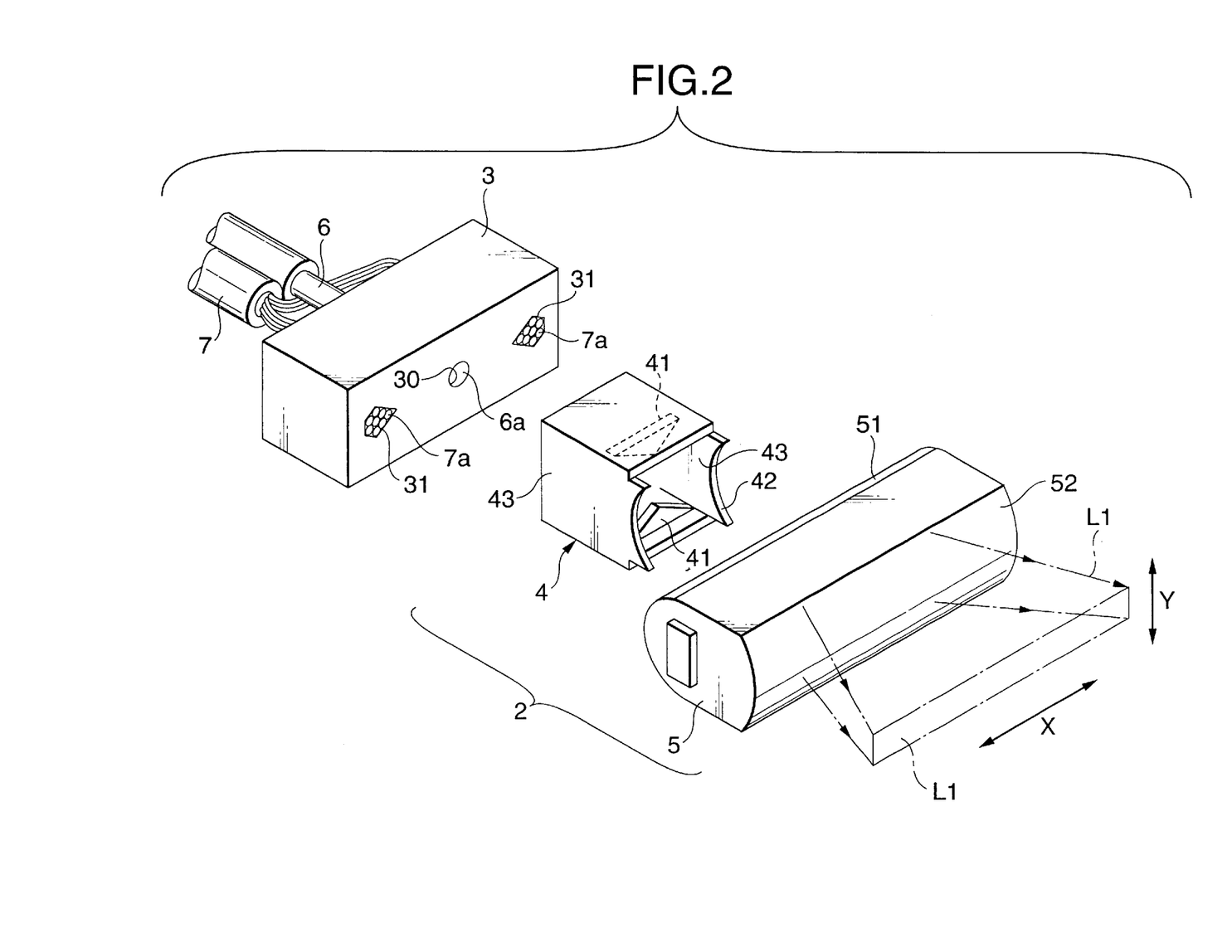
FIG. 2 is an exploded perspective view to show an optical system.

In FIG. 1, a head unit of a photo detector of an embodiment of the invention comprises a pair of split cases 11 and 12, a fixation device 3, a light shield pipe 4, a cylindrical lens 5, and optical fibers 6 and 7 shown in FIG. 2. Both the split cases 11 and 12 in FIG. 1 are assembled into a head case 1, in which the fixation device 3, the light shield pipe 4 (an example of a shaping element), the cylindrical lens 5 (an example of an optical element), and the tips of the optical fibers 6 and 7 shown in FIG. 2 are housed.

The light shield pipe 4 and the cylindrical lens 5 make up an optical system 2 of the invention.

The fixation device 3 is provided with three fiber fixing holes 30, 31, and 31. The tip of the light emission optical fiber (light emission section) 6 is inserted into the center fiber fixing hole 30 and is fixed thereto. The tips of the light reception optical fibers (light reception section) 7 are inserted into the two fiber fixing holes 31 on both sides of the center hole and are fixed thereto. The tip faces of the optical fibers 6 and 7 form an emission face 6a of the light emission section and incidence faces 7a of the light reception section respectively. The base end part of the light emission optical fiber 6 faces a light source and on the other hand, the base end part of the light reception optical fibers 7 is provided with a photoelectric conversion element, forming a known photoelectric switch although not shown.

Figure 3A:
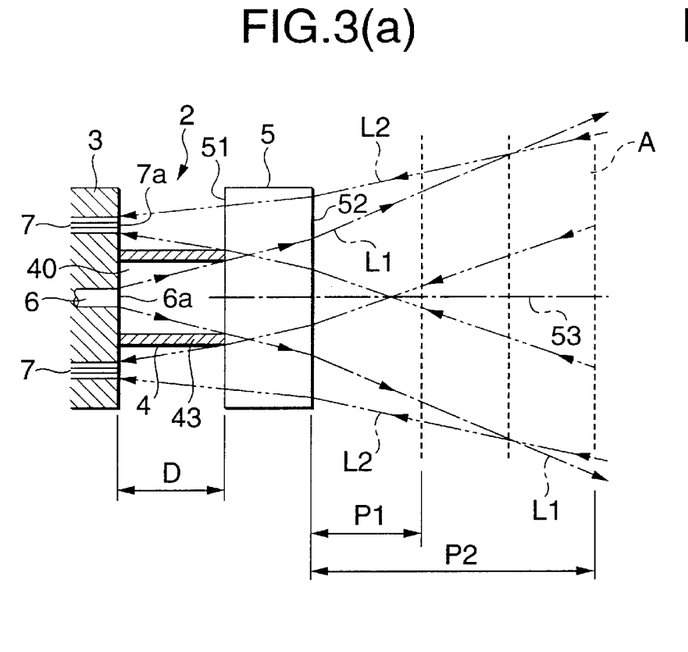
FIG. 3(a) is a sectional view to show the optical system.

As shown in FIG. 3(a), the fixation device 3, the light shield pipe 4, and the cylindrical lens 5 are placed in the case 1 (FIG. 1) in a state in which they are close to or come in contact with each other in order. The cylindrical lens 5 comprises a first interface 51 and a second interface 52 opposed to each other. The light shield pipe 4 is shaped like a square pipe and the emission face 6a of the light emission optical fiber 6 faces a hollow portion 40 of the light shield pipe 4. Detection light L1 emitted from the emission face 6a passes through the hollow portion 40 of the light shield pipe 4 and is emitted from the first interface 51 of the cylindrical lens 5 through the second interface 52 to a target area A, as indicated by the one-dotted chain lines. On the other hand, reflected light L2 by a detected object or the background in the target area A is incident on the incidence faces 7a of the light reception optical fibers 7 through the first interface 51 of the cylindrical lens 5 from the second interface 52 and is received as indicated by the two-dotted chain lines.

A part of the pencil of rays of the detection light. L1 passes through the light shield pipe 4 in FIG. 2, whereby the pencil of rays becomes substantially square in transverse section, and the detection light L1 is formed as the elongated detection light L1 substantially shaped like a belt by the one-way light gathering function of the cylindrical lens 5 shown in FIGS. 3(a) and 3(c) and is applied to the target area A. The detection light L1 is reflected by the detected object or the background in the target area A and the reflected light L2 is gathered by the one-way light gathering function of the cylindrical lens 5, is incident on the incidence faces 7a, and is received.

The light shield pipe 4 in FIG. 2 is provided with a light decrease wall (light decrease section) 41 for decreasing the quantity of light in the center in a length direction X of the detection light L1 substantially shaped like a belt (length direction in the transverse section of the pencil of rays).

Figure 3B:
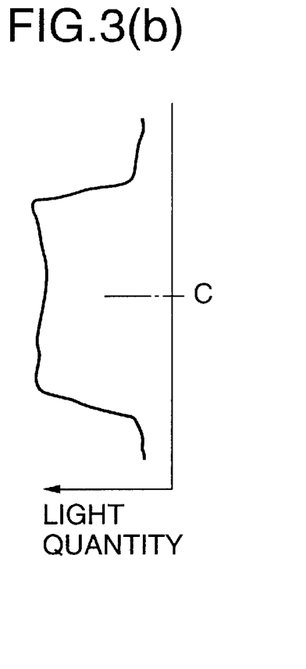
FIG. 3(b) is a characteristic chart to show change in light reception quantity.
Figure 3C:
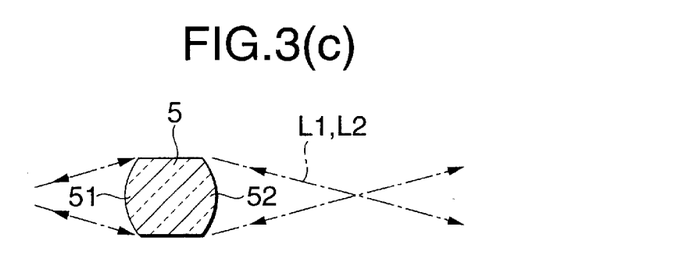
FIG. 3(c) is a sectional view of a lens.

If the light decrease wall 41 is not provided, the detection light L1 emitted from the emission face 6a has a strong light quantity in a center C (FIG. 3(b)) of the cross section orthogonal to the optical axis of the detection light L1 and on the other hand, it has a light quantity weakening as it goes to the end parts. In such a light quantity distribution, the light quantity varies largely from one portion of the target area A to another, thus variations in the detection capability occur.

In contrast, in the embodiment, the light decrease wall 41 is provided for decreasing the light quantity in the center, so that the light quantity can be made uniform and thus the variations in the detection capability can be suppressed.

The light shield pipe 4 in FIG. 2 has a pair of light shield sections 43. Front end faces 42 of the light shield sections 43 are curved to the shape fitted to the first interface 51 of the cylindrical lens 5 and are close to the first interface 51. The light shield sections 43 in FIG. 3(a) prevent light emitted from the emission face 6a to the first interface 51 of the cylindrical lens 5 and specularly reflected thereon from being incident on the incidence faces 7a, whereby stray light can be prevented from being incident on the incidence faces 7a, improving the detection accuracy.

The emission face 6a and the incidence faces 7a are disposed at positions distant from the first interface 51 of the cylindrical lens 5. The distance from the emission face 6a to the first interface 51 and that from each incidence face 7a to the first interface 51 are set to substantially the same distance D. The emission face 6a is disposed at the center of the incidence faces 7a. Therefore, in the embodiment, the emission face 6a, the incidence faces 7a, the light shield pipe 4, and the cylindrical lens 5 are disposed substantially symmetrically with a transverse section 53 of the cylindrical lens 5 as the center.

Figure 3D:
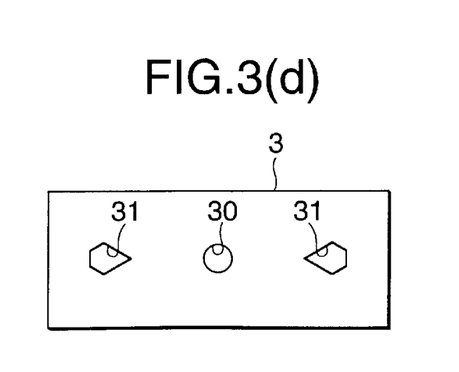
FIG. 3(d) is a front view of a fixation device.
Figure 3E:
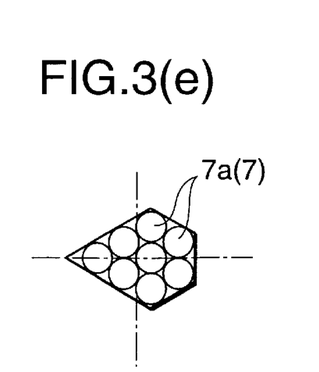
FIG. 3(e) is an enlarged front view of a light reception section.

As shown in FIG. 2, the light emission optical fiber 6 is made of one optical fiber, while the light reception optical fibers 7 consist of several optical fibers or a large number of optical fibers. As shown in FIGS. 3(d) and 3(e), each incidence face 7a of the light reception optical fibers 7 has a larger number of optical fibers placed on the outside distant from the light emission optical fiber 6, whereby the quantity of light received from the center C of the target area A is suppressed as shown in FIG. 3(b) for making the light reception quantity uniform. That is, the light quantity in the center C is decreased by means of the light decrease wall 41 for making the light quantity uniform, but the light reception quantity may not be made sufficiently uniform. Then, in the embodiment, the light reception quantity is furthermore made uniform by placing the incidence faces 7a as shown in FIGS. 3(d) and 3(e) so that the light quality in the end part can be received more than that in the center C.

Next, an example of the use of the detector will be described.

Figure 4A:
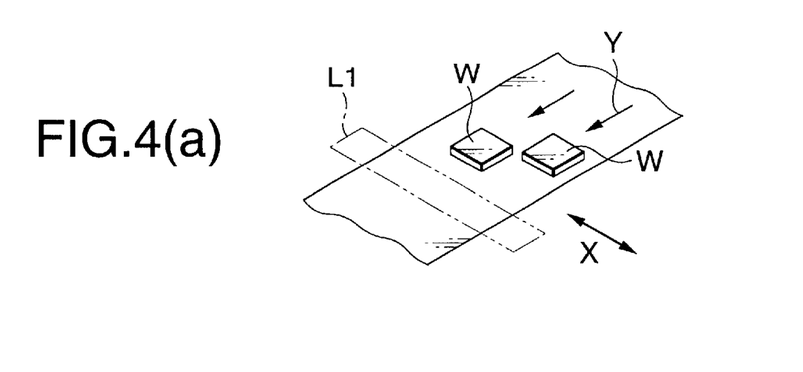
FIGS. 4(a) to 4(c) are perspective views to show the way of using a photo detector.

As shown in FIG. 4(a), if the position of each workpiece W in a width direction X thereof is undefined with respect to a flow direction Y of the workpiece W, the detector can detect the workpiece W with good accuracy regardless of the position of the workpiece W in the width direction X thereof.

Figure 4B:
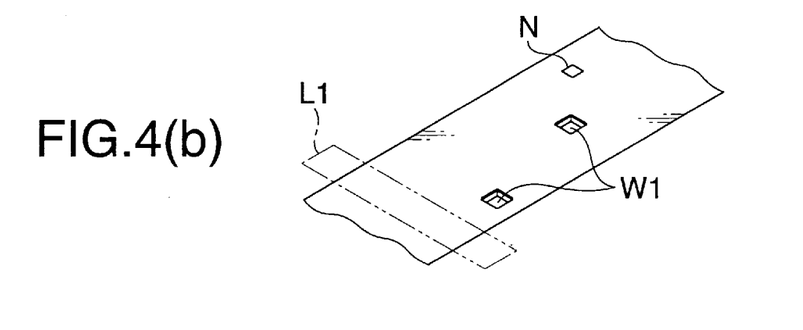
Figure 4C:
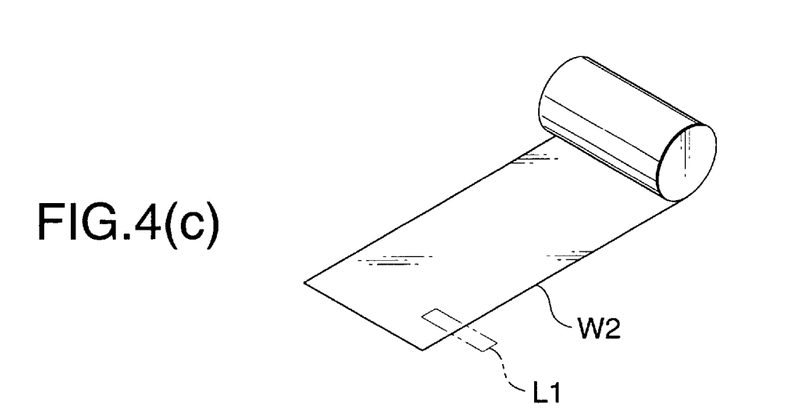
Figure 4D:
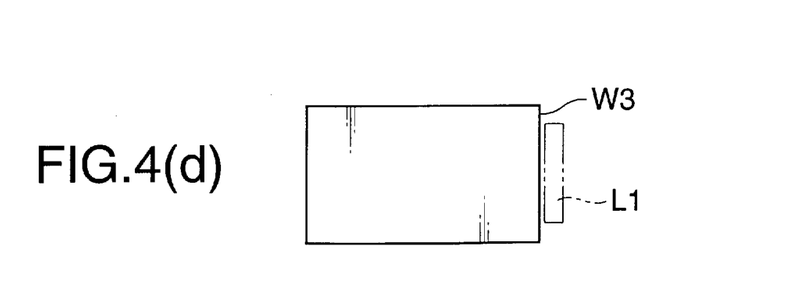
FIG. 4(d) is a front view to show the same.

Likewise, the detector can detect holes W1 in FIG.. 4(b), an edge W2 of a film in FIG. 4(c), and an edge W3 of a label in FIG. 4(d) with good accuracy.

Particularly if holes W1 and N different in size exist as in FIG. 4(b), unlike the conventional detectors using spotlight for detection, only large holes W1 can be detected without detecting the small hole N or the holes W1 and N can also be distinguished from each other by presetting a threshold value. Of course, the detector of the invention can detect any other object than holes.

The invention can be applied not only to detection of the presence or absence of an object, but also to color discrimination of an object to be detected.

The head unit gathers the detection light L1 and the reflected light L2 in FIG. 3(a) through one cylindrical lens 5 and forms belt-like detection light. Therefore, the head unit is miniaturized as compared with the conventional head unit with a large number of optical fibers arranged in a row.

Moreover, emitted light and received light are gathered through one cylindrical lens 5, so that a manufacturing error is hard to occur in the optical system and thus the manufacturability of the head unit is improved.

Figure 5A:
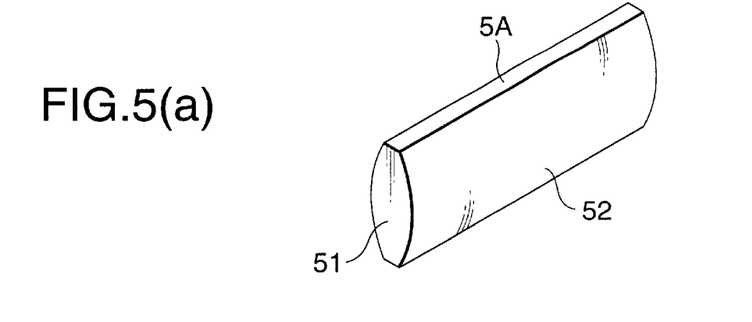
FIGS. 5(a) to 5(d) are perspective views to show other examples of belt-like-light generation lenses.
Figure 5B:
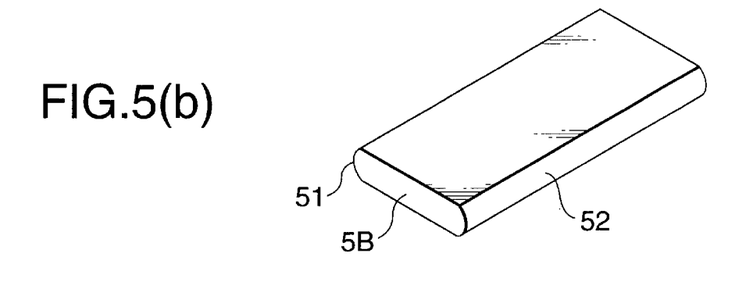

By the way, the embodiment uses the bar-like cylindrical lens 5 as the lens, but the lens may be a plate-like lens 5A as shown in FIG. 5(a) or a plate-like lens 5B as shown in FIG. 5(b).

As shown in FIG. 2, the embodiment uses the lens 5 having the light gathering function only in Y direction of X and Y directions orthogonal to each other in the transverse section of the pencil of rays (Y direction which is orthogonal to the length direction in the transverse section of the pencil of rays). However, in the second aspect of the invention, a pencil of rays substantially shaped like a belt may be formed and therefore the light gathering functions (light gathering degrees) relative to the two directions X and Y may differ.

Figure 5C:
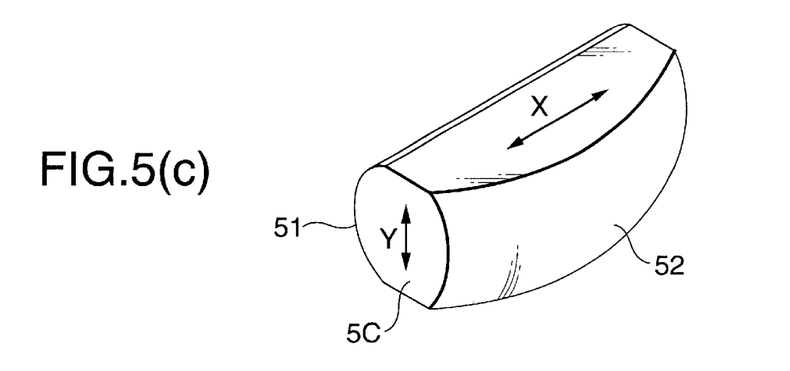
Figure 5D:
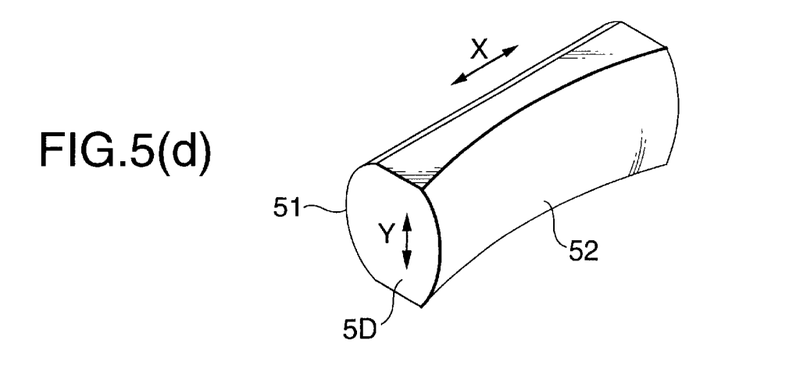

For example, a bar-like lens 5C shown in FIG. 5(c) or a bar-like lens 5D shown in FIG. 5(d) can also be adopted. The bar-like lens 5C in FIG. 5(c) has light gathering functions relative to the two directions X and Y and the light gathering degree relative to the Y direction is large as compared with that relative to the X direction. The bar-like lens 5D in FIG. 5(d) has a light gathering function relative to the Y direction and shows a divergence function relative to the X direction.

Figure 10B:
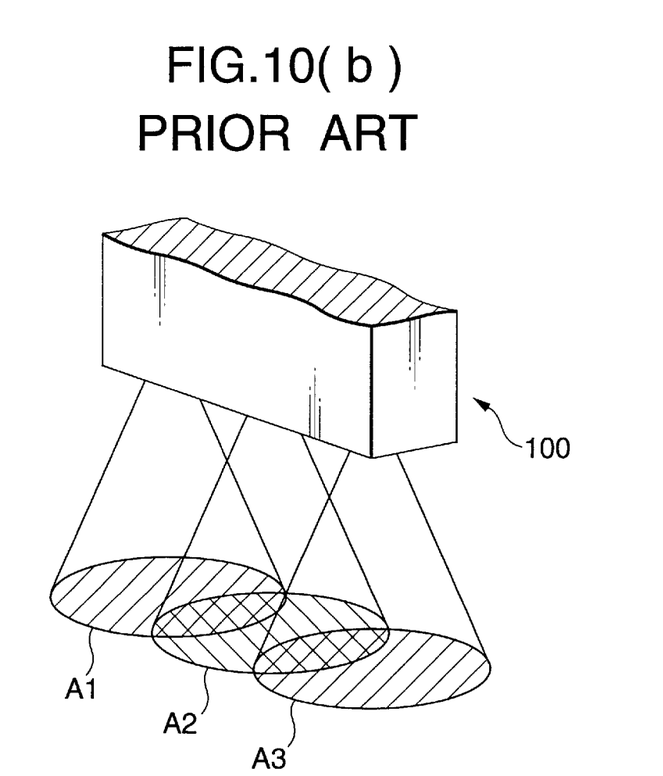
FIG. 10(b) is a view to show light emission areas by the conventional head unit.

By the way, the conventional detection head in FIG. 10(a) emits detection light from a plurality of light emission optical fibers 102, so that adjacent light emission areas A1, A2, and A3 overlap each other as shown in FIG. 10(b), thus it is feared that the detection accuracy may be degraded. In contrast, in the embodiment, one emission face 6a is set as shown in FIG. 2, thus the detection accuracy can be improved.

In the embodiment, the emission face 6a is placed at the center of the fixation device 3 in FIG. 3(a) and the incidence faces 7a are placed on both sides of the emission face 6a. Thus, if a distance P1 to a detected object is near, light reception areas provided by the two light reception faces 7a do not overlap, while if a distance P2 to a detected object is far, light reception areas provided by the two light reception faces 7a overlap. Generally, if the distance is near, the light quantity increases and if the distance is far, the light quantity decreases. Thus, in the embodiment, if the distance is near, the object is detected in the range in which the light reception areas do not overlap, while if the distance is far, the light reception areas are made to overlap, whereby a more light quantity can be obtained. Therefore, in the embodiment, even if the distance P1 or P2 changes a little, change in the light reception quantity lessens and the fear of erroneous detection lessens.

In the embodiment, the incidence faces 7a are placed on both sides of the emission face 6a, but the invention does not limit placement of the light emission section and the light reception section. For example, the incidence faces 7a may be placed coaxially surrounding the emission face 6a.

Figure 6A:
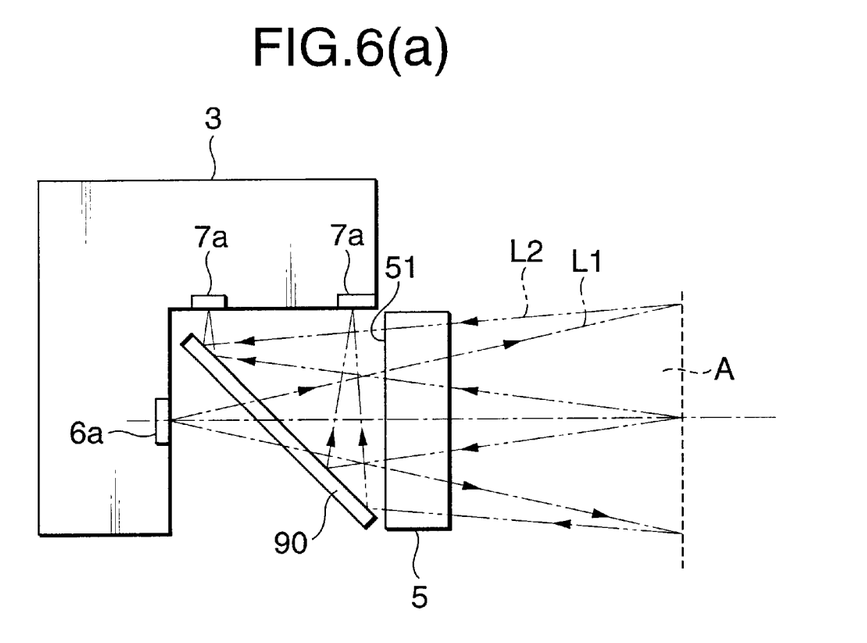
FIGS. 6(a) and 6(b) are schematic views to show modified examples.
Figure 6B:
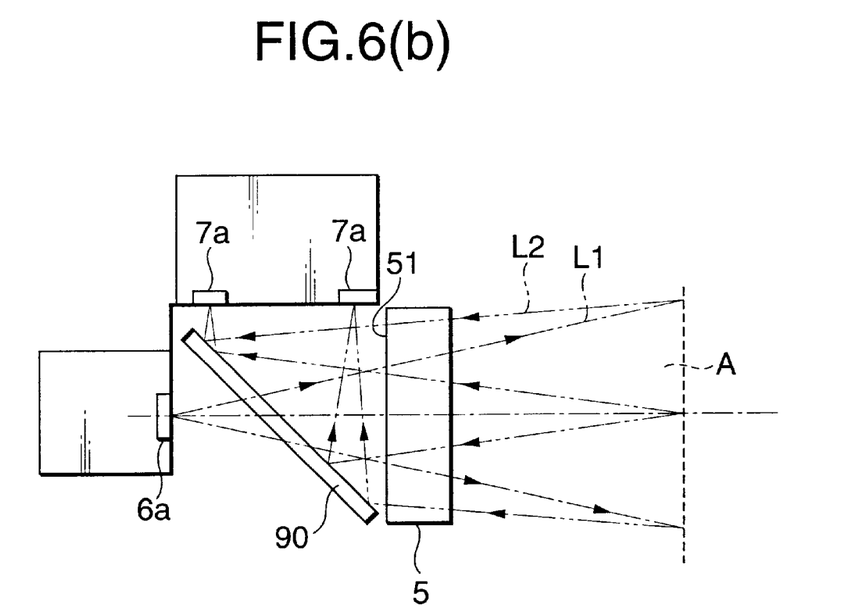

In the embodiment, the light shield pipe 4 and the light shield sections 43 are provided, but need not necessarily be provided in the invention. In place of the light shield sections 43, as shown in FIG. 6(a) or 6(b), a half mirror 90 may be provided on the side of the first interface 51 of the cylindrical lens 5 and the emission face 6a and the incidence faces 7a may be placed so as to be orthogonal to each other.

Figure 7A:
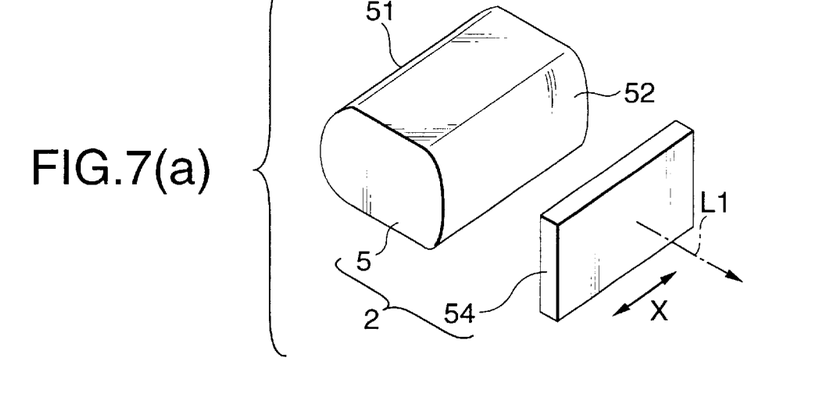
FIGS. 7(a) to 7(c) are perspective views to show other examples of optical systems.
Figure 7B:
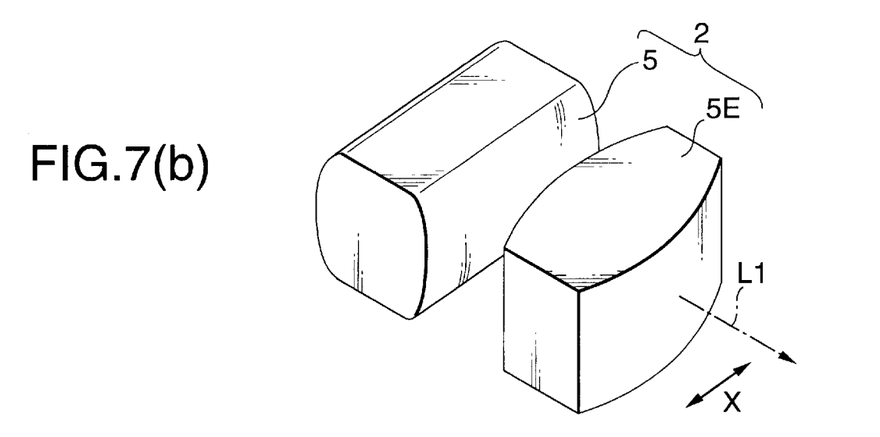
Figure 7C:
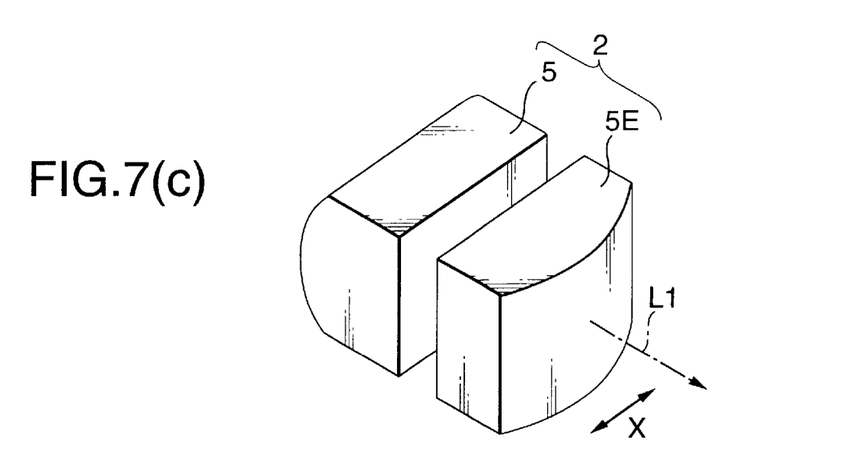

The embodiment uses one lens 5. However, in the first and second aspects of the invention, a lens cover 54 may be provided aside from the lens 5 as shown in FIG. 7(a) or two or more lenses 5 and 5E may be provided as optical elements as shown in FIGS. 7(b) and 7(c).

Figure 8:
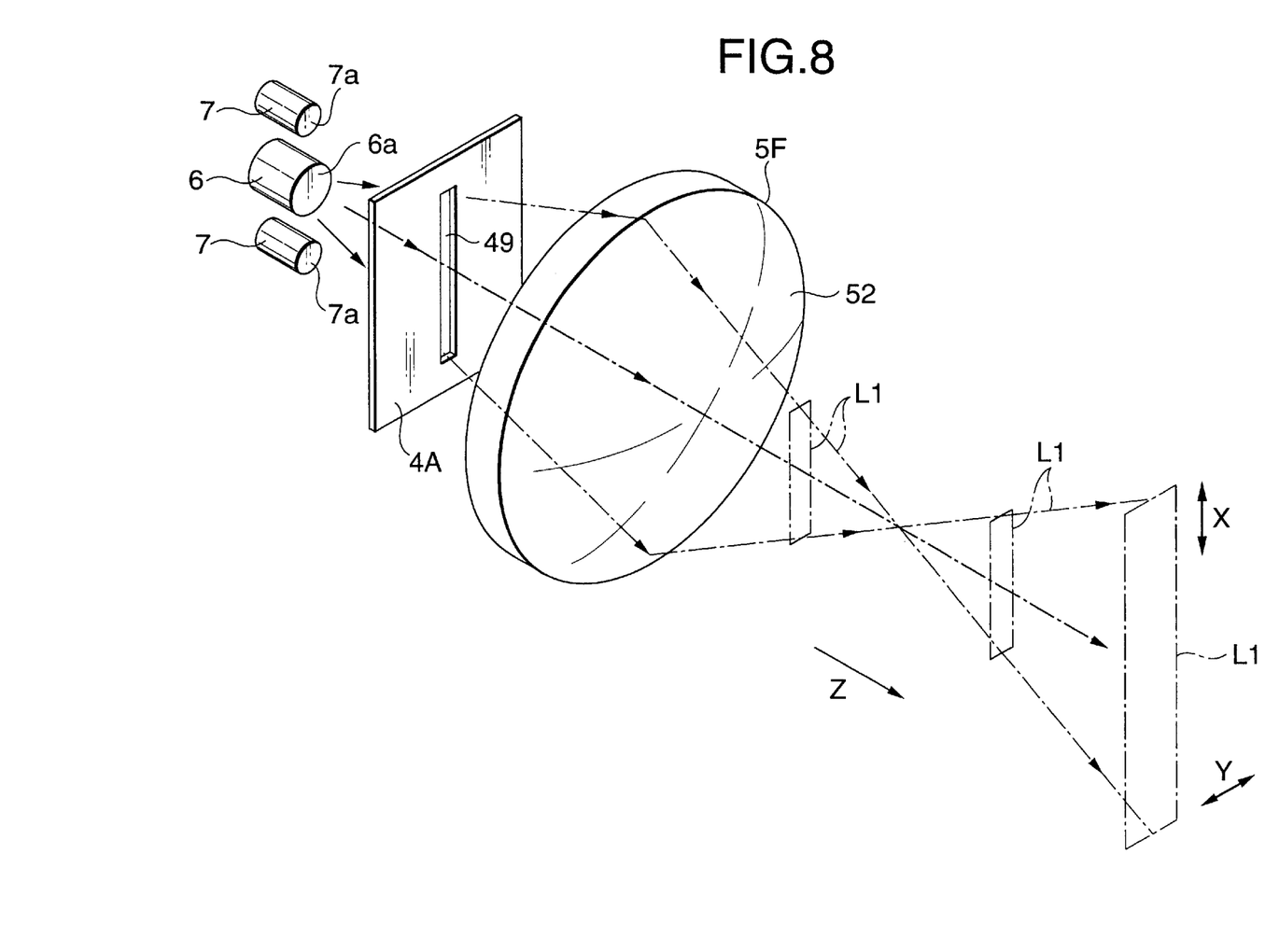
FIG. 8 is an exploded perspective view to show an optical system according to another embodiment of the invention.

FIG. 8 shows another embodiment.

In this embodiment, a shaping element comprising a light shield plate 4A formed with a through-hole 49 shaped like a groove (slit) and a convex lens 5F make up an optical system 2.

In the embodiment, a part of a pencil of rays emitted from an emission face 6a passes through the through-hole 49, whereby it is shaped substantially like a square and shaped detection light L1 is gathered in X and Y directions through the convex lens 5F and is emitted to a target area. Reflected light L2 in the target area passes through the convex lens 5F and the through-hole 49 and is incident on light reception faces 7a.

In the embodiment, the light gathering functions of the convex lens 5F are set to the same with respect to the X and Y directions. However, in the embodiment, a cylindrical lens can also be used in place of the convex lens 5F.

In the embodiment in FIG. 8, the light shield plate 4A may be placed ahead (Z) of the lens 5F.

Figure 9A:
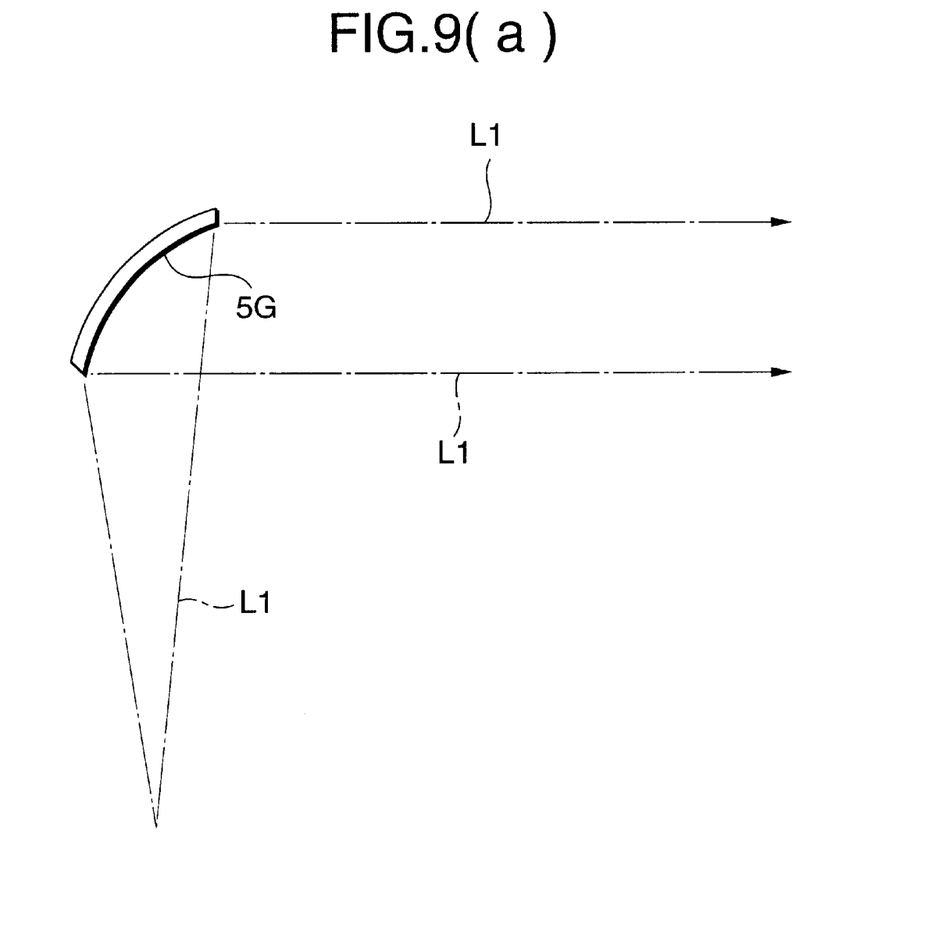
FIG. 9(a) is a plan view to show another example of optical element.
Figure 9B:
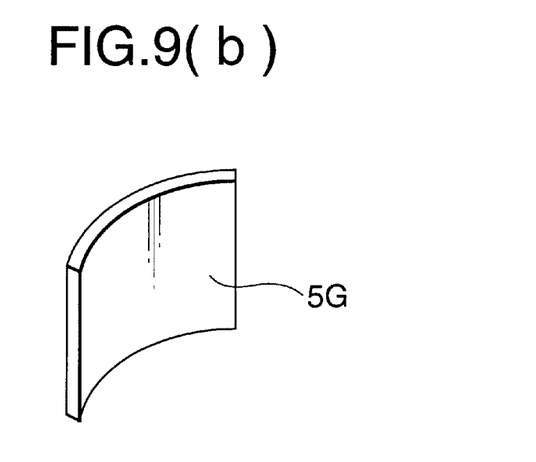
FIG. 9(b) is a perspective view to show still another example of the same.

The above embodiments use lenses as optical elements having the light gathering functions. However, in the invention, a concave mirror 5G having a cylindrical face may provide an optical element as shown in FIGS. 9(a) and 9(b) in place of the lens.

As described above, according to the first aspect of the invention, the optical system for shaping the light from the light emission section into a form substantially shaped like a belt and gathering the light in the direction orthogonal to the length direction for generating detection light substantially shaped like a belt is placed ahead of the light emission section and the light reception section. Thus, the light emission and reception head unit having a detection area substantially shaped like a belt such as a shape like a line or a belt can be miniaturized.

Since the detection area can be made elongated by the optical element, the detection accuracy is improved.

According to the second aspect of the invention, the belt-like-light generation lens is placed ahead of the light emission section and the light reception section. Thus, as in the first aspect of the invention, the light emission and reception head unit having a detection area substantially shaped like a belt such as a shape like a line or a belt can be miniaturized.

Since the detection area can be made elongated by the belt-like-light generation lens, the detection accuracy is improved.

Further, if light is gathered through one belt-like-light generation lens, a manufacturing error is hard to occur in the optical system and thus the manufacturability of the head unit is improved.

If the optical system is placed substantially symmetrically with the transverse section of the belt-like-light generation lens as the center, the detectable distance range is widened.

If the light shield section is provided for preventing stray light from being incident on the light reception section, the detection accuracy is furthermore improved.

If the light decrease section is provided for decreasing the quantity of light in the center in the length direction of detection light substantially shaped like a belt, the light quantities can be made uniform, so that the variations in detection capability can be suppressed.

What is claimed is:

1. A head unit of a photo detector for irradiating a target area with detection light having a pencil of rays substantially shaped as a transverse belt section and receiving light reflected in the target area, said head unit comprising:

a light emission section for emitting light to the target area;

an optical system for shaping the transverse section form of the pencil of rays from said light emission section into a form substantially shaped as a transverse belt and gathering the light in a direction orthogonal to a length direction in the transverse section of the pencil of rays substantially shaped as a transverse belt for generating detection light substantially shaped as a transverse belt; and a light reception section for receiving the light reflected in the target area and incident on said light reception section through said optical system.

2. The head unit as claimed in claim 1, wherein said optical system has one or more lenses as an optical element or elements for gathering the light.

3. The head unit as claimed in claim 2, wherein the lens has different light gathering functions relative to two directions orthogonal to each other in the transverse section of the pencil of rays.

4. The head unit as claimed in claim 1, wherein said optical system has a concave mirror as an optical element for gathering the light.

5. The head unit as claimed in claim 1, wherein said optical system has a shaping element for allowing a part of the pencil of rays of the light to pass through and shaping the transverse section form of the pencil of rays into a form substantially shaped like a square.

6. A head unit of a photo detector for irradiating a target area with detection light having a pencil of rays substantially shaped as a transverse belt section and receiving light reflected in the target area, said head unit comprising:

a light generation lens having different light gathering functions relative to two directions orthogonal to each other in the transverse section of the pencil of rays for generating detection light substantially shaped as a transverse belt;

a light emission section for emitting the detection light from a first interface of said light generation lens through a second interface of said light generation lens to the target area; and a light reception section for receiving reflected light incident on said light reception section through the first interface of said light generation lens from the second interface.

7. The head unit as claimed in claim 6, wherein said light generation lens, said light emission section, and said light reception section are housed in one case.

8. The head unit as claimed in claim 6, wherein an emission face of said light emission section and an incidence face of said light reception section are disposed at positions distant from the first interface, and wherein a distance from the emission face to the first interface and a distance from the incidence face to the first interface are set to substantially the same distance.

9. The head unit as claimed in claim 6, wherein an optical system including said light generation lens, said light emission section, and said light reception section are placed substantially symmetrically with a transverse section of said light generation lens as a center.

10. The head unit as claimed in claim 9, wherein a pair of light reception sections is provided as said light reception section.

11. The head unit as claimed in claim 10, wherein said light emission section is disposed between said pair of light reception sections.

12. The head unit as claimed in claim 6, wherein said light emission section and said light reception section are fixed to one fixation device.

13. The head unit as claimed in claim 6, further comprising a light shield section for preventing light emitted from said light emission section to the first interface and specularly reflected thereon from being incident on said light incidence section.

14. The head unit as claimed in claim 6, further comprising a light decrease section for decreasing the quantity of light in the center in a length direction in the transverse section of the pencil of rays substantially shaped as a transverse belt.

* * * * *